(No Model.) 2 Sheets—Sheet 1.
J. R. CARTER.
JOURNAL AND BEARING.
No. 605,996. Patented June 21, 1898.
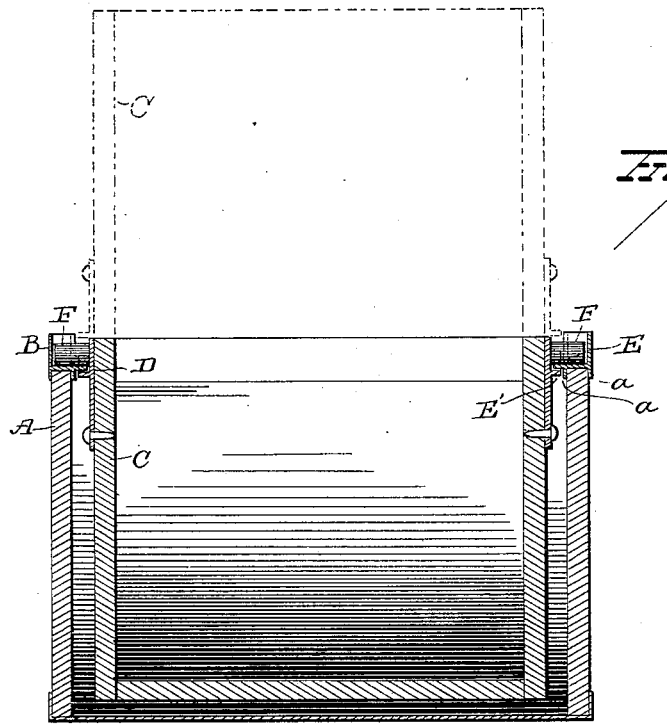
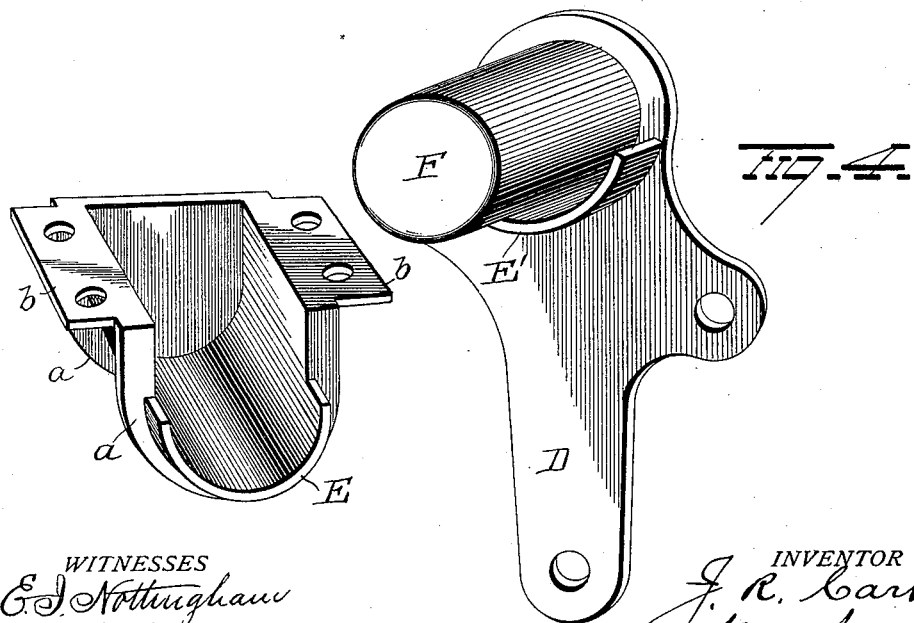
WITNESSES
E. J. Nottingham
G. F. Downing
INVENTOR
J. R. Carter
By N. A. Seymour
Attorney

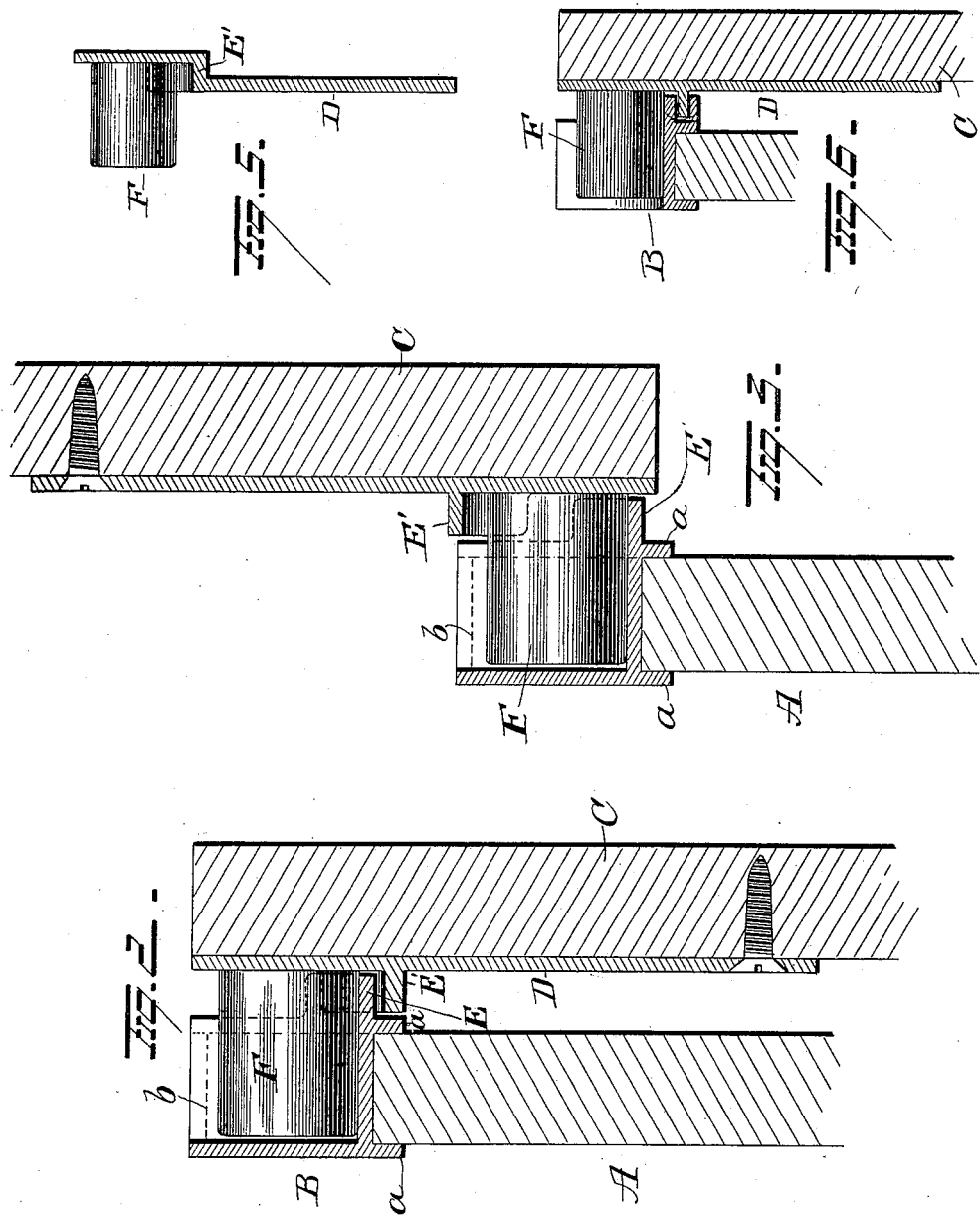

UNITED STATES PATENT OFFICE.

JOHN R. CARTER, OF CINCINNATI, OHIO.

JOURNAL AND BEARING.

SPECIFICATION forming part of Letters Patent No. 605,996, dated June 21, 1898.

Application filed April 1, 1898. Serial No. 676,107. (No model.)

*To all whom it may concern:*

Be it known that I, JOHN R. CARTER, a resident of Cincinnati, in the county of Hamilton and State of Ohio, have invented certain new and useful Improvements in Journals and Bearings; and I do hereby declare the following to be a full, clear, and exact description of the invention, such as will enable others skilled in the art to which it appertains to make and use the same.

My invention relates to an improvement in journals and bearings designed more particularly for use in washing-machines, but which may be applied to other machines, the object of the invention being to provide simple, cheap, and durable bearings for absolutely preventing displacement of the lower rubber of the washing-machine when the latter is in its normal position or in any position within the extremes of its regular oscillating movements, but which permit of the ready removal of the lower rubber when the latter is turned on its bearings beyond either extreme of the normal oscillation imparted to it by the actuating-shaft.

With these ends in view my invention consists in the parts and combinations of parts, as will be more fully explained, and pointed out in the claims.

In the accompanying drawings, Figure 1 is a view in transverse section of a tub and the lower rubber thereon, the dotted lines showing the rubber inverted for the purpose of releasing it from its bearings. Fig. 2 is an enlarged view in section through one of the journals and its bearings. Fig. 3 is a similar view showing the rubber inverted and in a position to be removed. Fig. 4 is a view in perspective of the journal and bearing. Figs. 5 and 6 are views of modified forms.

My improvement, while it can be applied to various machines, is particularly adapted for use on washing-machines of the class wherein a lower rubber is mounted to oscillate in a tub and an upper rubber mounted in the cover and oscillating over the lower rubber. In machines of this class the tub is approximately semicylindrical and the lower rubber, which constitutes the clothes-receptacle, preferably corresponds in shape thereto and is mounted in bearings carried by the tub. The upper rubber also corresponds in shape to the lower rubber and is mounted in bearings carried by the lid or cover, so that when the lid or cover is raised the upper rubber is elevated therewith, thus exposing the lower rubber or clothes-receptacle and permitting of the free and ready introduction and removal of the clothes. These rubbers are connected to a crank by suitable connections arranged to oscillate the rubbers in opposite directions.

The above features are common to all machines of this class, and my improvement relates particularly to the journals and bearings for supporting the lower rubber or clothes-receptacle.

A represents the tub, and B the bearings or journal-boxes, secured to the upper side edges of the tub. These bearings are each open at the top, and while I have represented them as closed at their outer ends it is evident that they can as well be left open.

Each journal-box has a semicylindrical or curved bottom to receive the cylindrical journals F of the upper rubber, and each is also provided with two outwardly-projecting parallel flanges $a$, adapted to rest against opposite faces of the sides. These flanges can receive the fastening-screws employed for locking the bearings in place or the bearings can be provided with laterally-projecting top flanges $b$ for the fastening-screws. Each bearing is provided at its bottom, on its inner edge, with an inwardly-projecting lip E, which latter is curved in the arc of a circle and projects inwardly beyond the face of the inner flange $a$.

C is the lower rubber, provided at its sides with the hangers D, secured centrally thereto. Each hanger is provided with an outwardly-projecting journal F, cylindrical in shape and conforming to the curvature of the bases of the bearings, and each is also provided at a point below the journal with an outwardly-projecting lip E', sufficient space or a sufficiently large curved recess being left between the journal F and the lip E' for the introduction of the lip E on its bearings. With this construction it will be seen that by simply inverting (wholly or partly) the rubber the journals enter the top of the bearings and seat themselves on the bottoms thereof, and by now turning the rubber to its normal position the lips E' pass under the lips E and lock the rubber against displacement. To remove the rubber, it is simply necessary to turn it on its bearings until the lips E are clear of the lips E', when it can be lifted from its seat.

In the modification Fig. 5 I show the hanger formed integral with the inner ends of the lips E', which permits the sides of the rubber resting slightly closer to the sides of the tub, thus increasing to a certain extent the capacity of the upper rubber or clothes-receptacle.

In the modification Fig. 6 I have shown the recess transferred from the hanger to the bearing.

It is evident that numerous slight changes might be resorted to in the general form and arrangement of the several parts herein shown and described without departing from the spirit and scope thereof, and hence I would have it understood that I do not limit myself to the precise details herein shown and described, but consider myself at liberty to make such slight changes and alterations as fairly fall within the spirit and scope of my invention.

Having fully described my invention, what I claim as new, and desire to secure by Letters Patent, is—

1. The combination with a bearing having a curved bottom and an inwardly-projecting curved lip, of a hanger having a journal adapted to rest in the bearing and a curved recess to receive the lip on the bearing.

2. The combination with a bearing having an open top and a lip projecting inwardly from adjacent the bottom of the bearing, of a hanger having a journal and a recess below the journal to receive the lip on the bearing, 3. The combination with a bearing having an open top, side flanges and an inwardly-projecting lip, of a hanger having a journal and curved recess below the journal to receive the lip on the bearing.

4. The combination with a bearing having an open top and an inwardly-projecting curved lip, of a hanger having a journal and a lip below the journal, the lip on the hanger adapted to rest below the lip on the bearing.

In testimony whereof I have signed this specification in the presence of two subscribing witnesses.

JOHN R. CARTER.

Witnesses:
HERMAN M. RITT,
GUSTAV R. WERNER.